United States Patent
Imai et al.

(10) Patent No.: US 9,291,255 B2
(45) Date of Patent: Mar. 22, 2016

(54) PLANETARY GEAR DEVICE

(71) Applicant: KAWASAKI JUKOGYO KABUSHIKI KAISHA, Kobe-shi, Hyogo (JP)

(72) Inventors: Hideyuki Imai, Akashi (JP); Maiko Sato, Beppu (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 14/627,241

(22) Filed: Feb. 20, 2015

(65) Prior Publication Data

US 2015/0167819 A1     Jun. 18, 2015

Related U.S. Application Data

(63) Continuation of application No. PCT/JP2013/068726, filed on Jul. 9, 2013.

(30) Foreign Application Priority Data

Aug. 23, 2012    (JP) ................................ 2012-183915

(51) Int. Cl.
*F16H 57/04*        (2010.01)
*B64C 27/12*        (2006.01)

(52) U.S. Cl.
CPC ............ *F16H 57/0409* (2013.01); *B64C 27/12* (2013.01); *F16H 57/0427* (2013.01); *F16H 57/0486* (2013.01)

(58) Field of Classification Search
CPC ............ F16H 57/0467; F16H 57/0479; F16H 57/048; F16H 57/0486
See application file for complete search history.

(56) References Cited

U.S. PATENT DOCUMENTS

| 5,472,383 | A | * | 12/1995 | McKibbin ................... 475/159 |
| 5,910,062 | A | | 6/1999 | Mizuta |
| 6,223,616 | B1 | | 5/2001 | Sheridan |

(Continued)

FOREIGN PATENT DOCUMENTS

| JP | 9-507284 A | 7/1997 |
| JP | 10-038058 A | 2/1998 |

(Continued)

OTHER PUBLICATIONS

International Search Report for PCT/JP 2013/068726 dated Aug. 6, 2013.

(Continued)

*Primary Examiner* — Tisha Lewis
(74) *Attorney, Agent, or Firm* — Sughrue Mion, PLLC

(57) ABSTRACT

A planetary gear device includes: a sun gear having external teeth; a plurality of planet gears having external teeth and meshed with the sun gear; a ring gear having internal teeth and meshed with the planet gears; and a baffle unit disposed between the planet gears adjacent to each other and configured to collect lubricant oil into a collection chamber. The baffle unit includes: a discharge outlet to discharge a portion of the lubricant oil collected in the collection chamber in an axial direction; and a ring gear oil supply hole to discharge another portion of the lubricant oil in a radially outward direction and supplied to the ring gear, and a weir member separable from the baffle unit and configured to cover a portion of the discharge outlet to reserve the lubricant oil to be discharged through the ring gear oil supply hole.

6 Claims, 8 Drawing Sheets

(56) References Cited

U.S. PATENT DOCUMENTS

| | | | |
|---|---|---|---|
| 8,398,525 | B2 | 3/2013 | Matsuoka et al. |
| 2011/0105270 | A1 | 5/2011 | Matsuoka et al. |
| 2013/0102432 | A1* | 4/2013 | Imai et al. ............... 475/159 |
| 2014/0169941 | A1* | 6/2014 | DiBenedetto et al. ........ 415/111 |
| 2015/0065285 | A1* | 3/2015 | McCune et al. ............ 475/159 |

FOREIGN PATENT DOCUMENTS

| | | | |
|---|---|---|---|
| JP | 10-318356 A | | 12/1998 |
| JP | 2001-208146 A | | 8/2001 |
| JP | 2010-156414 A | | 7/2010 |
| JP | 2011-094714 A | | 5/2011 |
| JP | 2011-220495 A | | 11/2011 |
| WO | 95/18319 A1 | | 7/1995 |
| WO | WO 2011129076 A1 | * | 10/2011 |
| WO | WO 2011129110 A1 | * | 10/2011 |

OTHER PUBLICATIONS

Decision of Grant for Corresponding JP 2012-183915 dated Aug. 6, 2013.

International Preliminary Report on Patentability dated Mar. 5, 2015 from the International Bureau in counterpart International Application No. PCT/JP/2013/068726.

* cited by examiner

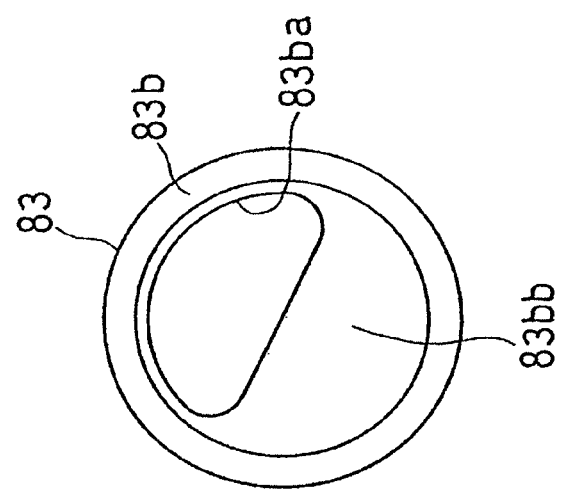
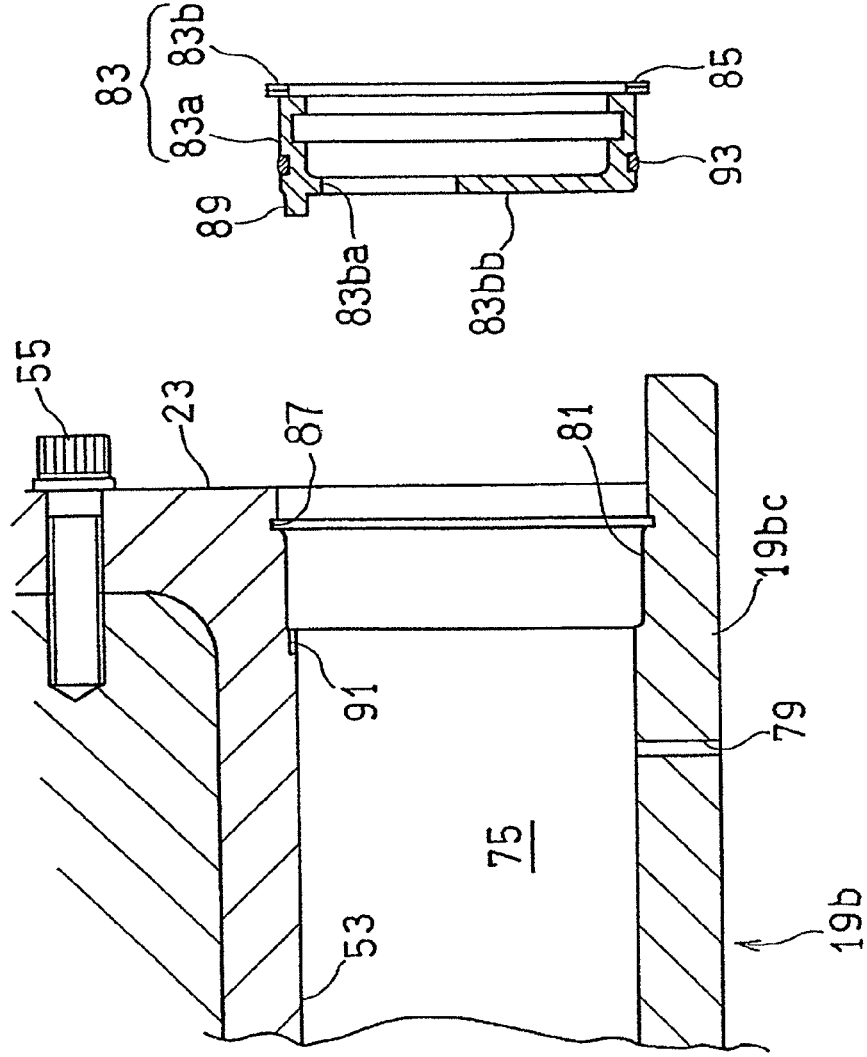
Fig. 7A
Fig. 7B

PLANETARY GEAR DEVICE

CROSS REFERENCE TO THE RELATED APPLICATION

This application is a continuation application, under 35 U.S.C. §111(a), of international application No. PCT/JP2013/068726, filed Jul. 9, 2013, which claims priority to Japanese patent application No. 2012-183915, filed Aug. 23, 2012, the disclosure of which are incorporated by reference in their entirety into this application.

BACKGROUND OF THE INVENTION

1. Field of the Invention

The present invention relates to planetary gear devices mainly used in power transmission mechanisms for aircrafts, and particularly relates to a lubricating structure for such planetary gear devices.

2. Description of Related Art

In recent years, one of the key issues in aircrafts is to reduce fuel consumption from the viewpoint of reduction in operation cost and environmental conservation. Therefore, also for planetary gear devices for use in aircraft engines, reduction in power loss is required.

Conventionally, this type of planetary gear device includes a mechanism for supplying lubricant oil to gears in order to lubricate and cool the gears. However, one of main causes of power loss in the gear device is stirring resistance of lubricant oil that is supplied around the gears. It is suggested that, in order to reduce stirring resistance of lubricant oil, for example, a baffle (barrier) is provided between planet gears adjacent to each other to reduce generation of swirl flow caused due to interference of flows of lubricant oil occurring around the planet gears adjacent to each other (see, for example, Patent Document 1).

Furthermore, it is also suggested that lubricant oil is temporarily collected in a space formed in the baffle, and a portion of the collected lubricant oil is discharged in the axial direction, and another portion of the collected lubricant oil is supplied to a ring gear via a through hole formed in the baffle, to use the lubricant oil for lubricating the ring gear (see, for example, Patent Document 2). In this case, a portion of an outlet in the axial direction of the baffle is covered with a weir to store the lubricant oil to be supplied to the ring gear, thereby enabling the ring gear to be assuredly lubricated.

PRIOR ART DOCUMENT

Patent Document

[Patent Document 1] JP Laid-open Patent Publication No. H09-507284

[Patent Document 2] JP Laid-open Patent Publication No. 2011-220495

SUMMARY OF THE INVENTION

However, optimal shape and size of the weir provided in the baffle vary depending on, for example, specifications and usage environment of a device in which the planetary gear device is used. Therefore, in a case where the weir is integrated with the baffle, the design of the entirety of the baffle needs to be changed according to change of the design of the weir, which is one of causes of increase in production cost. Moreover, when a portion of the outlet of the baffle is covered with the weir, it may be difficult to perform an operation of attaching a front plate to the gear device, resulting in processability being degraded in some cases.

The present invention is made in order to solve the aforementioned problems, and has an object to provide a planetary gear device that not only operates to collect lubricant oil to be supplied to main rotating components of the planetary gear device, and discharge lubricant oil, for reducing stirring resistance of the lubricant oil, but also facilitates changing of a design of a baffle unit for supplying a portion of the collected lubricant oil to a ring gear, according to a device to which the planetary gear device is applied.

In order to attain the aforementioned object, a planetary gear device according to the present invention includes: a sun gear having external teeth; a plurality of planet gears, each having external teeth and meshed with the sun gear; a ring gear having internal teeth and meshed with the planet gears; and a baffle unit disposed between the planet gears adjacent to each other and configured to collect lubricant oil into a collection chamber formed therein, in which the baffle unit includes a discharge outlet to discharge a portion of the lubricant oil collected in the collection chamber in an axial direction; and a ring gear oil supply hole to discharge another portion of the lubricant oil collected in the collection chamber in a radially outward direction to supply it to the ring gear, and a weir member separable from the baffle unit and configured to cover a portion of the discharge outlet to reserve the lubricant oil to be discharged through the ring gear oil supply hole.

In this structure, the ring gear oil supply hole and a weir are formed in the baffle unit disposed between the planet gears adjacent to each other, to achieve reduction in stirring resistance of the lubricant oil and lubricating of the ring gear, while change of a design of the weir according to, for example, specifications of a device to which the gear device is applied, is facilitated since the weir member in which the weir is formed, is provided separately from the baffle unit.

In a planetary gear device according to one embodiment of the present invention, a front plate that supports one end portion of a planet shaft serving as a rotary shaft of each of the plurality of planet gears is connected by using a connecting member which is fastened in an axial direction, to a bottom wall located at an axial end portion, of the collection chamber of the baffle unit, on a side opposite to the discharge outlet side. More specifically, for example, the connecting member may include a bolt and a nut that is screwed on the bolt, and the bolt may be inserted into the front plate and the baffle unit from the front plate side, and the nut may be screwed on an end of the bolt on the collection chamber side of the baffle unit. In this structure, when the front plate is to be mounted to the bottom wall of the collection chamber, the connecting member can be fastened in the axial direction in a state where the weir member that is separately formed is not mounted. Therefore, assembling of the planetary gear device having the baffle unit that includes the weir to assuredly supply lubricant oil to the ring gear, is facilitated, thereby reducing production cost.

In a planetary gear device according to one embodiment of the present invention, the weir member may be fitted into the discharge outlet, and may be axially retained by a diameter-reducible ring-shaped member. In this structure, in assembling of the planetary gear device, for example, fastening of the connecting member in the axial direction in a state where the weir member that is separately formed is not mounted, is facilitated.

In a planetary gear device according to one embodiment of the present invention, the weir member may cover a portion of the discharge outlet which is located backward with respect to a revolving direction of the planet gears on an outer side in a radial direction of a planet carrier that supports the plurality of planet gears. In such a structure, a sufficient amount of lubricant oil to be supplied through the ring gear oil supply hole to the ring gear can be reserved in the baffle unit. In particular, centrifugal force and Coriolis force generated by the revolution of each planet gear are both applied to the lubricant oil collected in the baffle unit. Therefore, the portion located outward of the planet gear in the radial direction and backward with respect to the revolving direction of the planet gear, that is, a portion located in a direction of the resultant force obtained by combining the above forces, is covered with the weir, thereby effectively reserving the lubricant oil.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7A is an enlarged view of a portion in FIG. 5, representing a side view of a weir member;

FIG. 7B is an enlarged view of a portion in FIG. 5, representing a plan view of a weir member.

DESCRIPTION OF EMBODIMENTS

Figure 1:
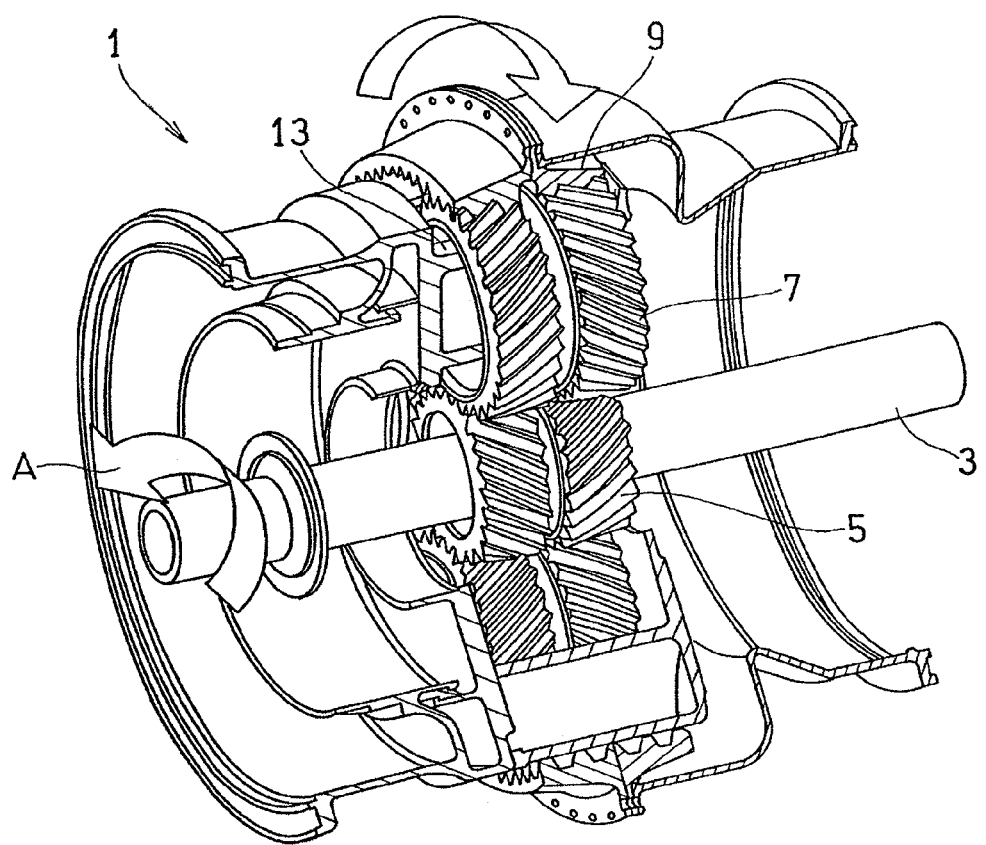
FIG. 1 is a partially cutaway perspective view of a planetary gear device according to one embodiment of the present invention.

Hereinafter, embodiments of the present invention will be described with reference to the drawings. FIG. 1 is a perspective view showing a planetary gear device 1 according to one embodiment of the present invention. The planetary gear device 1, which may be mounted to an engine of a helicopter or an aircraft, is connected to a gas turbine engine (not shown) via an input shaft 3, to transmit power of the gas turbine engine to two rotors (not shown), as independent outputs, respectively. In the following description, a side (the lower left side in FIG. 1), in the axial direction, on which the gas turbine engine is disposed is referred to as a front side, and the opposite side is referred to as a rear side.

Figure 2:
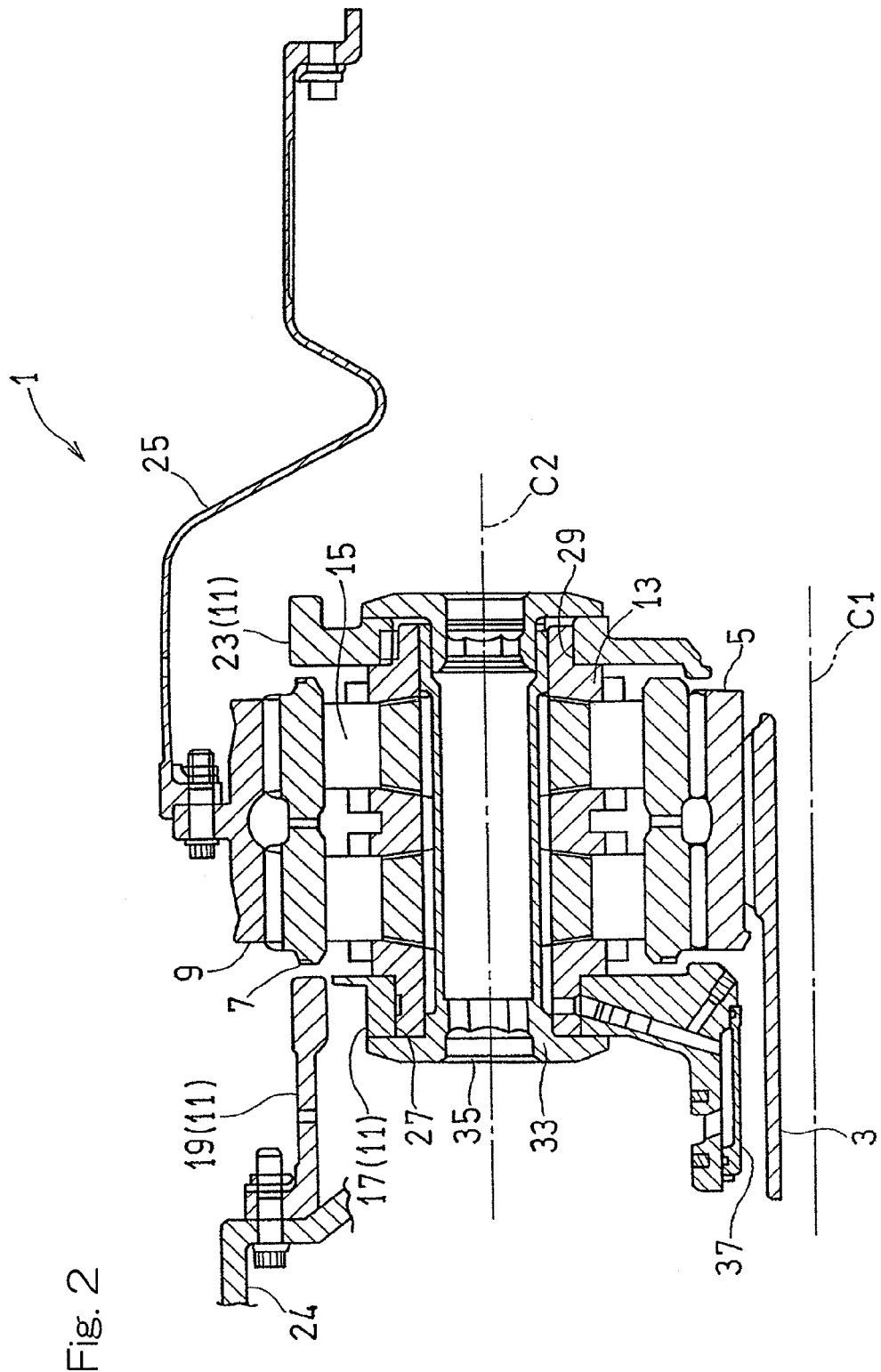
FIG. 2 is a longitudinal cross-sectional view of the planetary gear device shown in FIG. 1.

FIG. 2 is a longitudinal cross-sectional view showing the planetary gear device 1 shown in FIG. 1. As shown in FIG. 2, the planetary gear device 1 is implemented as a double-row gear mechanism, and includes a sun gear 5, a plurality of (in the example described herein, five) planet gears 7, a ring gear 9, a planet carrier 11, and a plurality of (in the example described herein, five) planet shafts 13. The sun gear 5 is a double-row helical gear that includes two helical gears each having external teeth, and the external teeth of the two helical gears are inclined in directions opposite to each other. The sun gear 5 is fitted onto an outer periphery of the input shaft 3 that serves as a rotary shaft. Each planet gear 7 is a double-row helical gear which corresponds to the sun gear 5 and includes two helical gears each having external teeth. Each of the planet gears 7 is meshed with the sun gear 5 in a condition in which the planet gear 7 is rotatably mounted via a double row bearing 15 to an outer periphery of a corresponding one of the planet shafts 13 that are hollow and serve as rotary shafts. In the present embodiment, five planet gears 7 are disposed so as to be equally spaced from each other in a circumferential direction of the sun gear 5. The ring gear 9 is a double-row helical gear that includes two helical gears each having internal teeth, and the ring gear 9 is meshed with the five planet gears 7.

Figure 3:
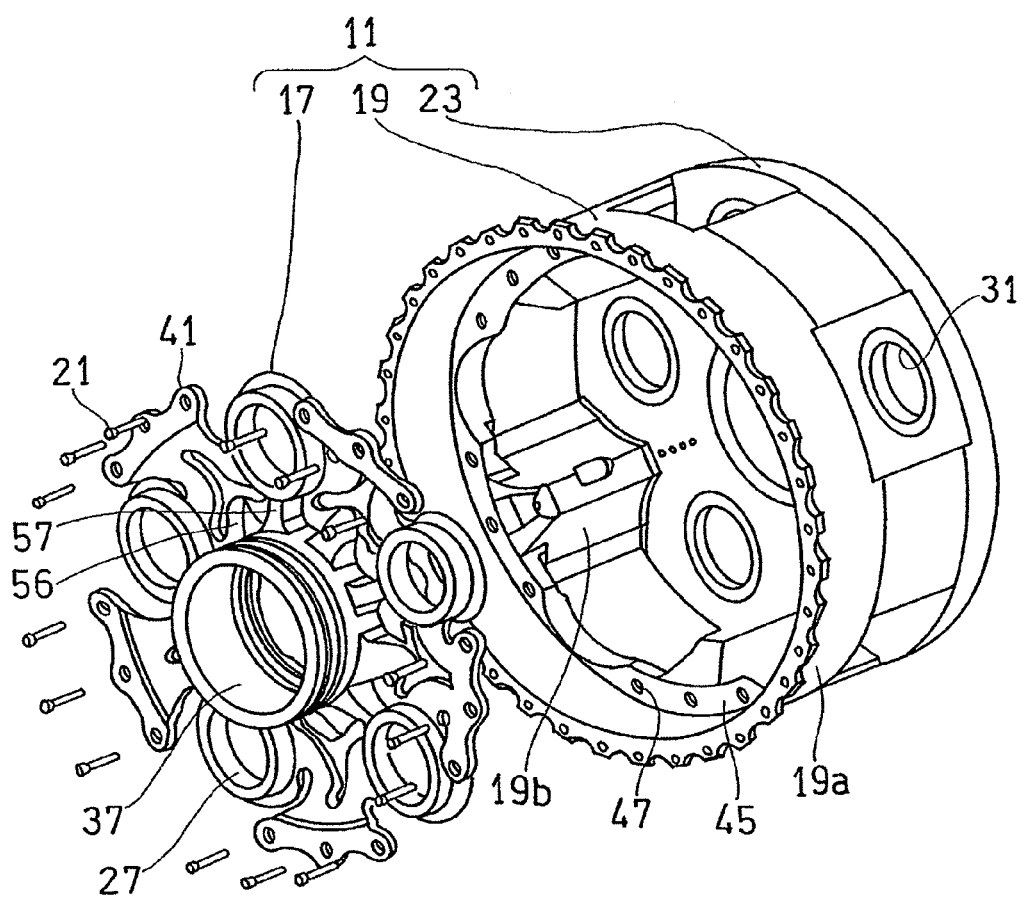
FIG. 3 is an exploded perspective view of a planet carrier used for the planetary gear device shown in FIG. 1.

The planet shaft 13, which serves as the rotary shaft of the planet gear 7, is supported, at the front end portion thereof, by an annular front plate 17 that shares the same axis C1 with the input shaft 3. As shown in an exploded perspective view of FIG. 3, the front plate 17 is connected to an inner peripheral portion of a cylindrical drum 19, which is coaxially arranged with the front plate 17, by means of a plurality of bolts 21. The drum 19 includes a cylindrical drum body 19a that forms the front end portion thereof, and a plurality of baffle units 19b that are integrated with the drum body 19a and extend rearward from the drum body 19a. Each baffle unit 19b is a column-like member that has a substantially trapezoidal cross-sectional shape having a width which is gradually reduced from the outer side toward the inner side in the radial direction. Baffle units 19b are disposed at a respective circumferential sites, each positioned between the planet shafts 13 (FIG. 2), such that the baffle units 19b are equally spaced from each other. A structure of each baffle unit 19b will be described below in detail.

In the rear end portion of the drum 19, that is, in the rear end portions of the baffle units 19b, an annular back plate 23 is integrally formed. The back plate 23 supports rear end portions of the planet shafts 13. In this way, the drum 19, and the front plate 17 and the back plate 23 that are connected to each other via the drum 19 cooperatively form a planet carrier 11 that supports the planet shafts 13 and the planet gears 7. By the planet carrier 11, positions of the planet shafts 13 relative to each other, that is, positions of the planet gears 7 relative to each other are fixed.

The front end portion of the drum 19 is connected, by means of bolts, to a front output shaft 24, which is coaxial with the input shaft 3. Power generated by revolution movement of the five planet gears 7 about the axis C1 is outputted, as driving force, to a rotor (not shown) disposed on the front side, via the drum 19 and the front output shaft 24. On the other hand, the outer peripheral portion of the ring gear 9 is connected to a flexible support 25 arranged coaxially with the input shaft 3. Power generated by rotation of each planet gear 7 about an axis C2 is outputted, as driving force, to a rotor (not shown) disposed on the rear side, via the ring gear 9 and the flexible support 25.

Support through holes 27 for supporting the planet shafts 13 are formed on the outer circumferential side of the front plate 17, and the front end portions of the planet shafts 13 fit into the support through holes 27. Similarly, the rear end portions of the planet shafts 13 are fitted into support through holes 29 of the back plate 23. In this state, the front plate 17, the planet shafts 13, and the back plate 23 are axially fastened and fixed by means of fixing supports 31 and bolts 35 each having a longitudinal size. In this way, the planet shafts 13 are supported by the front plate 17 and the back plate 23.

Figure 4:
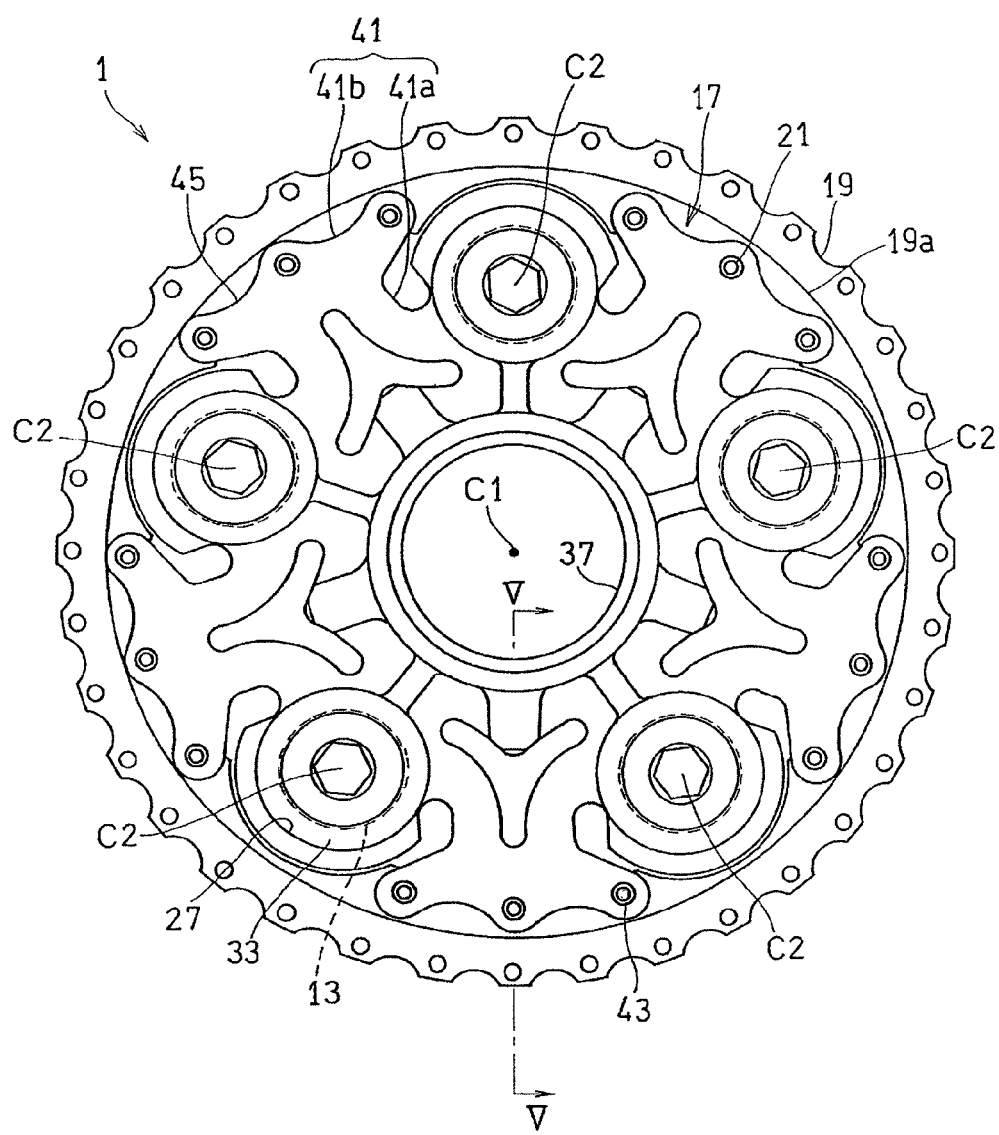
FIG. 4 is a front view of a front plate used in the planetary gear device shown in FIG. 1 as viewed from the front thereof.

FIG. 4 is a front view showing the front plate 17 as viewed from the front thereof. As shown in FIG. 4, the front plate 17 has a disk-like shape, and has, at the center portion of the disk-like shape, an input shaft insertion hole 37 through which the input shaft 3 is inserted. In a toroidal plate portion located radially outward of the input shaft insertion hole 37, various cut portions are formed in order to appropriately reduce the weight. The outer diameter of the front plate 17 substantially corresponds to the inner diameter of the drum body 19a that is a cylindrical portion of the drum 19.

The front plate 17 has connecting pieces 41 for connecting the front plate 17 to the drum 19 that is a separate member. Each connecting piece 41 includes an arm portion 41a that extends radially outwardly from between the support through holes 27 adjacent to each other, and a connecting portion 41b formed at the outer diametric end of the arm portion 41a. Namely, a plurality of (five in the present embodiment) the connecting portions 41b are provided intermittently in the circumferential direction in the outer circumferential portion of the front plate 17. Each connecting portion 41b has a plurality of (in the example shown in FIG. 4, three) bolt insertion holes 43 that are disposed substantially along the circumferential direction so as to be equally spaced from each other.

Figure 5:
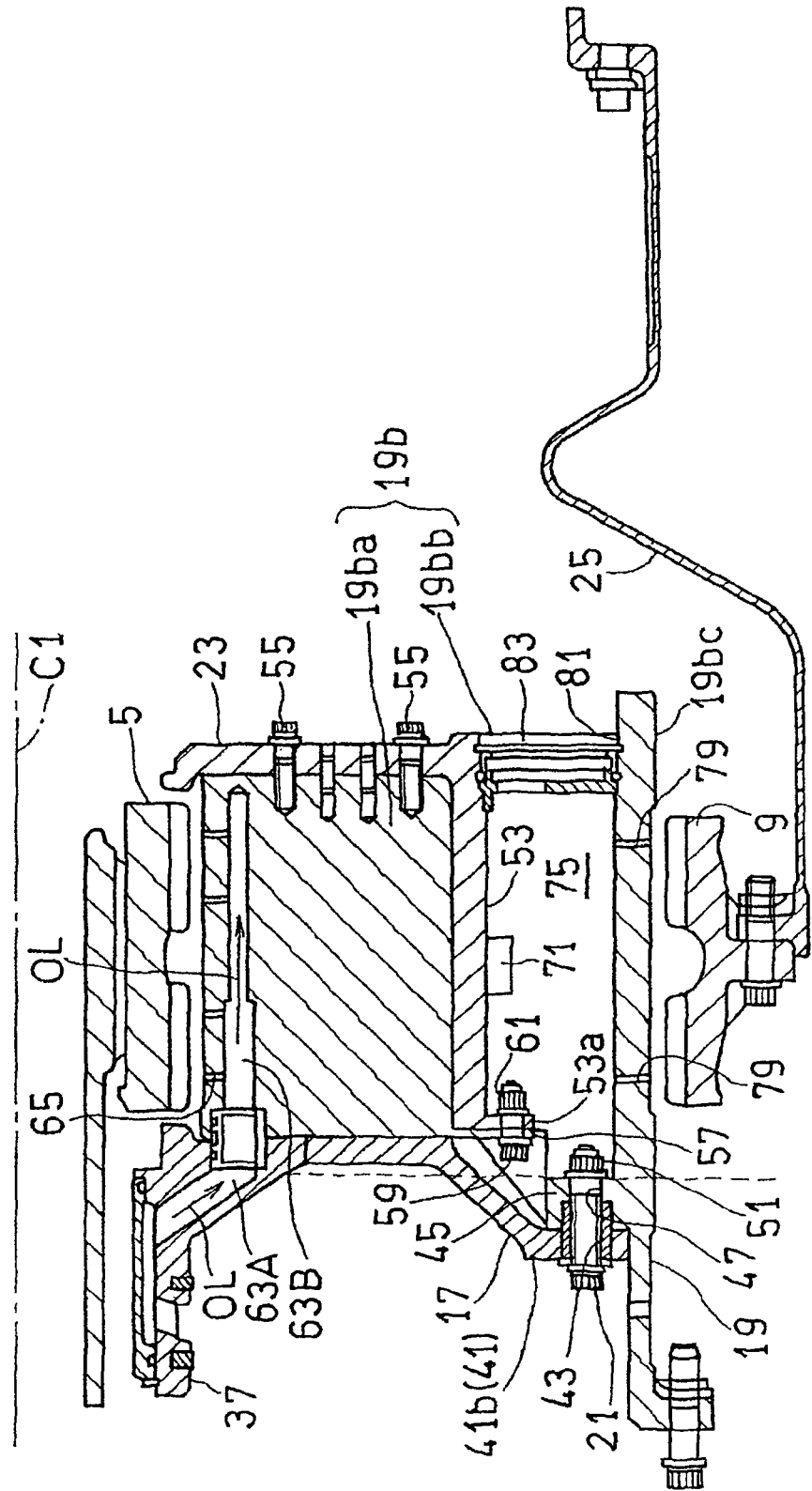
FIG. 5 is a cross-sectional view taken along a line V-V shown in FIG. 4.

As shown in FIG. 5 that is a cross-sectional view taken along a line V-V shown in FIG. 4, a flange-like drum inner side connecting portion 45 is provided on the inner peripheral surface of the drum 19 so as to project in the radially inward direction. The drum inner side connecting portion 45 has a plurality of bolt insertion holes 47 that penetrate therethrough in the axial direction. The bolts 21, which are connecting members, are inserted, from the front side, into the bolt insertion holes 43 of the front plate 17 and the bolt insertion holes 47 of the drum 19, and, in this state, nuts 51 are screwed on the end of the bolts 21, to connect the front plate 17 to the drum inner side connecting portion 45 of the drum 19. The connecting portions 41b are axially positioned on a front side relative to axial positions of the support through holes 27 as indicated by a broken line.

The nuts 51 are screwed on the bolts 21, instead of forming threaded holes in the front plate 17 or the drum 19 into which the bolts 21 are screwed, because members, such as the front plate 17 and the drum 19, which form the carrier 11, are made of a material, such as a titanium alloy, which is likely to crack under a high stress, in order to reduce the weight of the entirety of the planetary gear device 1, and, if the members that form the carrier 11 have threaded holes, crack may occur in such members. When, as in the present embodiment, the nuts 51 are screwed on the bolts 21 instead of the bolts 21 being screwed into threaded holes, the weight can be reduced without reducing reliability of the planetary gear device 1.

Next, a structure of each baffle unit 19b will be described. As shown in FIG. 5, the inner portion of the baffle unit 19b is divided, by an inner wall 53, into a solid inner portion 19ba and a hollow outer portion 19bb. The inner wall 53 is formed integrally with the back plate 23 by forging or by machining process with the use of same material. The inner portion 19ba of the baffle unit 19b is fixed to the back plate 23 by means of bolts 55. Further, a connecting piece 53a is provided on the front side end portion of the inner wall 53 of the baffle unit 19b so as to project toward the outer diameter side. The connecting piece 53a of the inner wall 53 is overlapped with a connecting piece 57 formed on the front side end portion of the inner portion 19ba so as to project toward the outer diameter side. In this state, on an end of a bolt 59 inserted from the connecting piece 57 side of the inner portion 19ba, a nut 61 is screwed from the connecting piece 53a side of the inner wall 53, thereby providing connection.

Gear lubricant oil guiding paths 63A and 63B are formed inside the front plate 17 and the inner portion 19ba, respectively, so as to introduce a lubricant oil OL from the outside. On the inner diameter side of the gear lubricant oil guiding path 63B of the inner portion 19ba, a plurality of oil supply holes 65 through which the lubricant oil OL is supplied from the gear lubricant oil guiding path 63B to the sun gear 5 are formed.

Figure 6:
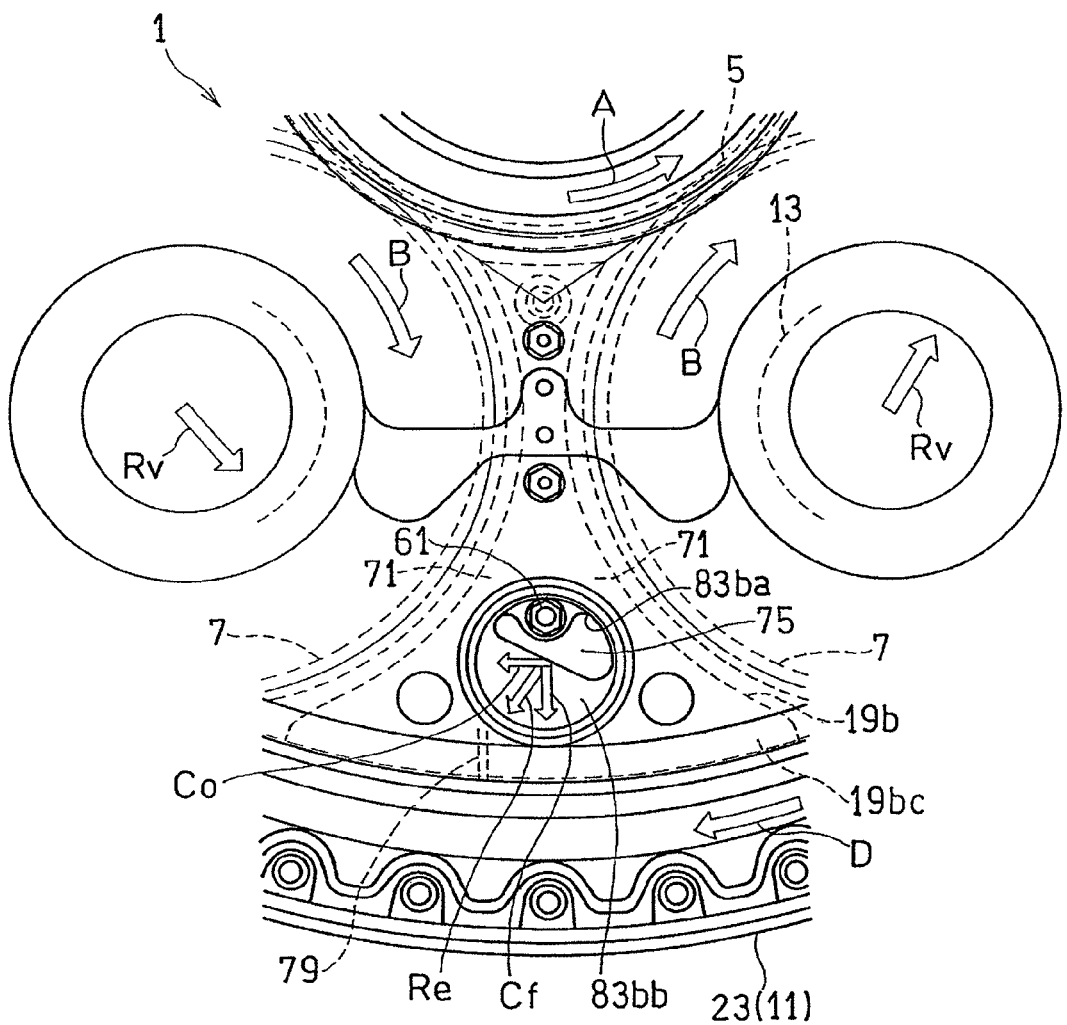
FIG. 6 is a rear view of a back plate used in the planetary gear device shown in FIG. 1 as viewed from the rear thereof.

Further, as shown in FIG. 6, the baffle unit 19b has opposite side faces formed with respective collection openings 71, at locations in the vicinity of a boundary between the inner portion 19ba and the outer portion 19bb, for collecting the lubricant oil OL into the baffle unit 19b. The outer portion 19bb of the baffle unit 19b shown in FIG. 5 has an inner space which communicates with the collection openings 71 and forms a collection chamber 75, in which the lubricant oil OL collected through the collection openings 71 is temporarily stored.

Further, ring gear oil supply holes 79 that are through holes extending in the radial direction are formed on an outer wall portion 19bc positioned on the outermost peripheral side of the baffle unit 19b. A portion of the lubricant oil OL collected in the collection chamber 75 is supplied to the ring gear 9 through the ring gear oil supply holes 79. As shown in FIG. 6, the ring gear oil supply hole 79 is positioned backward of the circumferentially center portion of the outer wall portion 19bc with respect to a revolving direction Rv of the planet gear 7. As shown in FIG. 5, a plurality of (two in the present embodiment) the ring gear oil supply holes 79 are aligned so as to be spaced at predetermined intervals in the axial direction. The number and positions of each of the oil supply holes 65 and the ring gear oil supply holes 79 may be determined as appropriate.

An opening in the axially rear end portion of the collection chamber 75 shown in FIG. 5 serves as an axial discharge outlet 81 for discharging the lubricant oil OL from the collection chamber 75 to the outside of the baffle unit 19b in the axial direction. As described above, the drum 19 is connected to the front plate 17 by means of the bolts 21 and the nuts 51 which are connecting members, and the drum inner side connecting portion 45 on the baffle unit 19b side, into which the bolts 21 are inserted, is disposed so as to project on the inner side of the outer wall portion 19bc of the baffle unit 19b in the axially front end portion. Namely, the drum inner side connecting portion 45 is located at an axial end portion of the collection chamber 75, which is on a side axially opposite to the axial discharge outlet 81 side thereof, to form a bottom wall of the collection chamber 75. A weir member 83 is fitted into the axial discharge outlet 81 so as to cover a portion of the axial discharge outlet 81.

As shown in FIGS. 7A and 7B in which respective portions in FIG. 5 is enlarged, the weir member 83 is a substantially a cylindrical member that is separate from the baffle unit 19b, that is, formed as a separable individual member. The weir member 83 includes a cylindrical portion 83a having an outer peripheral surface which is fitted into the inner peripheral surface portion of the axial discharge outlet 81. Further, the weir member 83 has one end in the axial direction mounted with a C ring 85, which is a diameter-reducible ring-shaped member. The C ring 85 is engaged with a latching groove 87 formed in the inner peripheral surface of the discharge outlet 81, thereby axially retaining the weir member 83 having fitted into the inner peripheral surface portion of the discharge outlet 81.

One opening of the cylindrical portion 83*a* of the weir member 83 is covered with a disk-like bottom portion 83*b* having a diameter larger than that of the cylindrical portion 83*a*. The bottom portion 83*b* has a portion formed with a semicircular opening which serves as a discharge portion 83*ba* for discharging the lubricant oil OL from the collection chamber 75 to the outside of the baffle unit 19*b* in the axial direction. On the other hand, the remaining portion, that is, a portion other than the discharge portion 83*ba* of the bottom portion 83*b* serves as a weir portion 83*bb* that covers a portion of the axial discharge outlet 81.

As shown in FIG. 6, the weir portion 83*bb* covers a portion of the axial discharge outlet 81 (FIG. 7), which is located backward with respect to the revolving direction Rv on the outer side of the back plate 23 in the radial direction. In the planetary gear device 1, the sun gear 5 rotates in the direction indicated by an arrow A, and, due to the driving force of the rotation, each planet gear 7 rotates in the direction indicated by an arrow B, while the planet gears 7 revolves together with the planet carrier 11 in the direction indicated by an arrow Rv. The ring gear 9 rotates in the direction indicated by an arrow D. Centrifugal force Cf and Coriolis force Co generated by the revolution of each planet gear 7 are both applied to the lubricant oil OL collected in the collection chamber 75 (FIG. 5) of the baffle unit 19*b*. Therefore, the portion located in the radially outward direction and backward with respect to the revolving direction, that is, a portion located in a direction of the resultant force Re obtained by combining the above forces, is covered with the weir portion 83*bb*, thereby effectively reserving the lubricant oil OL.

However, a more specific shape of the weir portion 83*bb* may vary depending on, for example, specifications and an operating condition of a device to which the planetary gear device 1 is applied, that is, depending on, for example, the number of planet gears to be used, a rate at which and a direction in which the planet gears revolve, and a required flow rate of the lubricant oil. In the planetary gear device 1 according to the present embodiment, since the weir member 83 in which the weir portion 83*bb* is formed is provided separately from the baffle unit 19*b*, change of a design of the weir portion 83*bb* can be facilitated.

Further, as shown in FIGS. 7A and 7B, the cylindrical portion 83*a* of the weir member 83 has, in a portion thereof in the circumferential direction, a positioning projection 89 that projects forward in the axial direction. The positioning projection 89 is engaged with a positioning recess 91 provided in the inner peripheral wall of the collection chamber 75, thereby fixing the circumferential position of the weir member 83 relative to the baffle unit 19*b*. Namely, by the positioning projection 89 and the positioning recess 91, as described above, an area of the axial discharge outlet 81 which is covered with the weir portion 83*bb* is determined. An annular sealing member 93 that seals a portion between the weir member 83 and the axial discharge outlet 81 is attached onto the outer periphery of the cylindrical portion 83*a* of the weir member 83.

Next, an operation of the planetary gear device 1 according to the above embodiment will be described.

The lubricant oil OL is guided through the gear lubricant oil guiding paths 63A and 63B shown in FIG. 5 from the outside into the baffle unit 19*b* and ejected toward the sun gear 5 through the oil supply holes 65 of the inner portion 19*ba* of the baffle unit 19*b*. Most portion of the lubricant oil OL so ejected is collected into the baffle unit 19*b* through the collection openings 71.

The lubricant oil OL collected in the baffle unit 19*b* flows into the collection chamber 75, and, subsequently, a portion of the lubricant oil is blocked by the weir portion 83*bb* and supplied through the ring gear oil supply holes 79 to the ring gear 9. Thus, the ring gear 9 is effectively lubricated. Moreover, the lubricant oil OL which overflows the weir portion 83*bb* of the collection chamber 75 is discharged through the discharge portion 83*ba* to the outside of the planetary gear device 1 in the axially rearward direction. Thus, attachment of a large amount of the lubricant oil OL to the planet gears 7 can be prevented, to reduce stirring resistance of the lubricant oil OL.

Figure 8:
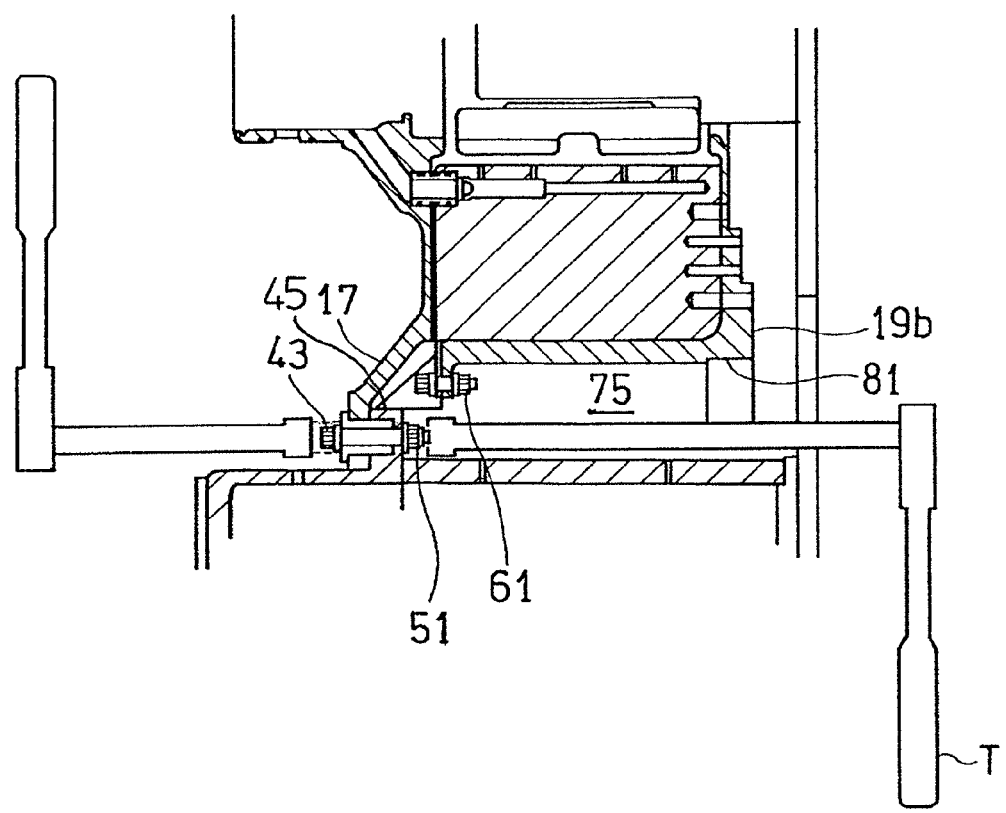
FIG. 8 is a cross-sectional view of the planetary gear device, shown in FIG. 1, which is being assembled.

Furthermore, the weir member 83 is formed separately from the baffle unit 19*b*, thereby facilitating an operation of attaching the front plate 17 in the assembling of the planetary gear device 1. Specifically, as shown in FIG. 8, when the front plate 17 is to be mounted to the bottom wall (the drum inner side connecting portion 45) of the collection chamber 75, the weir member 83 is not mounted to the axial discharge outlet 81 and the axial discharge outlet 81 can be completely opened outward in the axial direction. Therefore, a tool T used for fastening a connecting member, that is, the nut 51 in the example shown in FIG. 8, which is to be attached to the collection chamber 75 of the baffle unit 19*b*, can be inserted through the axial discharge outlet 81, thereby facilitating an operation of fastening the nut 51.

Thus, in the planetary gear device 1 according to the present embodiment, the ring gear oil supply holes 79 and the weir portion 83*bb* are formed in each baffle unit 19*b* disposed between the planet gears 7, 7 adjacent to each other, to achieve reduction in stirring resistance of the lubricant oil OL and lubricating of the ring gear 9, while change of a design of the weir portion 83*bb* according to, for example, specifications of a device to which the gear device 1 is applied, is facilitated since the weir member 83 in which the weir portion 83*bb* is formed, is provided separately from the baffle unit 19*b*.

Although the present invention has been described above in connection with the embodiments thereof with reference to the drawings, various additions, modifications, or deletions can be made without departing from the gist of the present invention. Accordingly, such additions, modifications, and deletions are to be construed as included in the scope of the present invention.

REFERENCE NUMERALS

1 Planetary gear device
5 Sun gear
7 Planet gear
9 Ring gear
11 Planet carrier
13 Planet shaft
17 Front plate
19 Drum
19*b* Baffle unit
21 Bolt (Connecting member)
23 Back plate
45 Drum inner side connecting portion (Bottom wall of collection chamber)
47 Oil supply hole
51 Nut (Connecting member)
71 Collection opening
75 Collection chamber 79 Ring gear oil supply hole
81 Axial discharge outlet
83 Weir member
83bb Weir portion
OL Lubricant oil

What is claimed is:

1. A planetary gear device comprising:
   a sun gear having external teeth;
   a plurality of planet gears, each having external teeth and meshed with the sun gear;
   a ring gear having internal teeth and meshed with the planet gears; and
   a baffle unit disposed between the planet gears adjacent to each other and configured to collect lubricant oil into a collection chamber formed therein,
   the baffle unit including a discharge outlet to discharge a portion of the lubricant oil collected in the collection chamber in an axial direction; and a ring gear oil supply hole to discharge another portion of the lubricant oil collected in the collection chamber in a radially outward direction to supply it to the ring gear, and a weir member attachable/detachable from the discharge outlet of the baffle unit and configured to cover a portion of the discharge outlet to reserve the lubricant oil to be discharged through the ring gear oil supply hole.

2. The planetary gear device as claimed in claim 1, wherein a front plate that supports one end portion of a planet shaft serving as a rotary shaft of each of the plurality of planet gears is connected, by using a connecting member which is fastened in an axial direction, to a bottom wall located at an axial end portion of the collection chamber of the baffle unit, on a side opposite to the discharge outlet side.

3. A planetary gear device comprising:
   a sun gear having external teeth;
   a plurality of planet gears, each having external teeth and meshed with e sun gear;
   a ring gear having internal teeth and meshed with the planet gears; and
   a baffle unit disposed between the planet gears adjacent to each other and configured to collect lubricant oil into a collection chamber formed therein,
   the baffle unit including a discharge outlet to discharge a portion of the lubricant oil collected in the collection chamber in an axial direction; and a ring gear oil supply hole to discharge another portion of the lubricant oil collected in the collection chamber in a radially outward direction to supply it to the ring gear, and a weir member separable from the baffle unit and configured to cover a portion of the discharge outlet e the lubricant oil to be discharged through the ring gear oil supply hole,
   wherein the weir member is fitted into the discharge outlet, and is axially retained by a diameter-reducible ring-shaped member.

4. The planetary gear device as claimed in claim 2, wherein the connecting member includes a bolt and a nut that is screwed on the bolt, and wherein the bolt is inserted into the front plate and the baffle unit from the front plate side, and the nut is screwed on an end of the bolt on the collection chamber side of the baffle unit.

5. The planetary gear device as claimed in claim 1, wherein the weir member covers a portion of the discharge outlet, which is located backward with respect to a revolving direction of the planet gears on an outer side in a radial direction of a planet carrier that supports the plurality of planet gears.

6. The planetary gear device as claimed in claim 1, wherein the weir member is fitted into in inner surface of the discharge outlet of the baffle unit.

* * * * *